(12) United States Patent
Haustein et al.

(10) Patent No.: US 9,607,004 B2
(45) Date of Patent: Mar. 28, 2017

(54) STORAGE DEVICE DATA MIGRATION

(71) Applicant: International Business Machines Corporation, Armonk, NY (US)

(72) Inventors: Nils Haustein, Soergenloch (DE); Alexander Saupp, Oestrich-Winkel (DE)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 14/308,046

(22) Filed: Jun. 18, 2014

(65) Prior Publication Data

US 2015/0370845 A1    Dec. 24, 2015

(51) Int. Cl.
*G06F 17/30*      (2006.01)

(52) U.S. Cl.
CPC ...... *G06F 17/302* (2013.01); *G06F 17/30079* (2013.01)

(58) Field of Classification Search
CPC ............. G06F 17/30371; G06F 17/30386
See application file for complete search history.

(56) References Cited

U.S. PATENT DOCUMENTS

| | | | |
|---|---|---|---|
| 8,327,250 B1 | 12/2012 | Goel | |
| 8,447,944 B2 | 5/2013 | Saika | |
| 9,176,964 B1 * | 11/2015 | McCreight | G06F 17/30097 |
| 9,323,758 B1 * | 4/2016 | Stacey | G06F 17/30097 |
| 2002/0069280 A1 * | 6/2002 | Bolik | G06F 17/30067 |
| | | | 709/225 |
| 2010/0205161 A1 * | 8/2010 | Turner | G06F 17/30115 |
| | | | 707/697 |
| 2011/0040943 A1 * | 2/2011 | Kondo | G06F 3/0647 |
| | | | 711/162 |
| 2011/0107044 A1 * | 5/2011 | Young | G06F 9/5016 |
| | | | 711/162 |

(Continued)

FOREIGN PATENT DOCUMENTS

| | | |
|---|---|---|
| WO | 03032171 A2 | 4/2003 |
| WO | 2013014694 A1 | 1/2013 |

OTHER PUBLICATIONS

Mell et al, "The NIST Definition of Cloud Computing", National Institute of Standards and Technology, NIST Special Publication 800-145, Gaithersburg, MD.

(Continued)

*Primary Examiner* — Richard Bowen
(74) *Attorney, Agent, or Firm* — Heather S. Chatterton

(57) ABSTRACT

A method for migrating files from a source server to a target server are disclosed. The method includes determining file property information for one or more data files on the source server. One or more data file entries are created in a file property table with the file property information for each data file. A data file entry is selected from the file property table. The file property information of the selected data file entry from the file property table is compared to the file property information of the corresponding data file stored in the source server to determine whether there is a match. In response to determining a mismatch, the data file in the source server is copied to the target server. The data file copied to the target server is verified to be the same as the data file of the source server.

17 Claims, 8 Drawing Sheets

(56) References Cited

U.S. PATENT DOCUMENTS

| | | | |
|---|---|---|---|
| 2012/0023146 A1* | 1/2012 | Shoji | G06F 3/0611 |
| | | | 707/827 |
| 2012/0084524 A1* | 4/2012 | Gokhale | G06F 17/30466 |
| | | | 711/162 |
| 2012/0297246 A1 | 11/2012 | Liu et al. | |
| 2012/0303739 A1 | 11/2012 | Ferris | |

OTHER PUBLICATIONS

Wendt, J., "Data migration products: Proceed with caution", SearchStorage.com, Tech Report, Aug. 16, 2006, (first published in Storage magazine's Aug. 2006 issue), Copyright 2000-2014, Tech Target. http://searchstorage.techtarget.com/report/Data-migration-products-Proceed-with-caution.

* cited by examiner

| File and Directory Name | File Size | Data Checksum | ctime | atime | mtime | ACL and Metadata Checksum | Copy OK | ACL OK |
|---|---|---|---|---|---|---|---|---|
| /fs/officeDoc1 | 1MB | ABC1234 | 2013-01-01 00:00:00 | 2013-01-02 02:00:00 | 2013-01-01 01:00:00 | 0987DEF | Y | Y |
| /fs/officeDoc2 | 10MB | 012ABC4 | 2013-02-01 00:00:00 | 2013-02-02 02:00:00 | 2013-02-01 01:00:00 | AB123CD | N | N |

FIG. 2

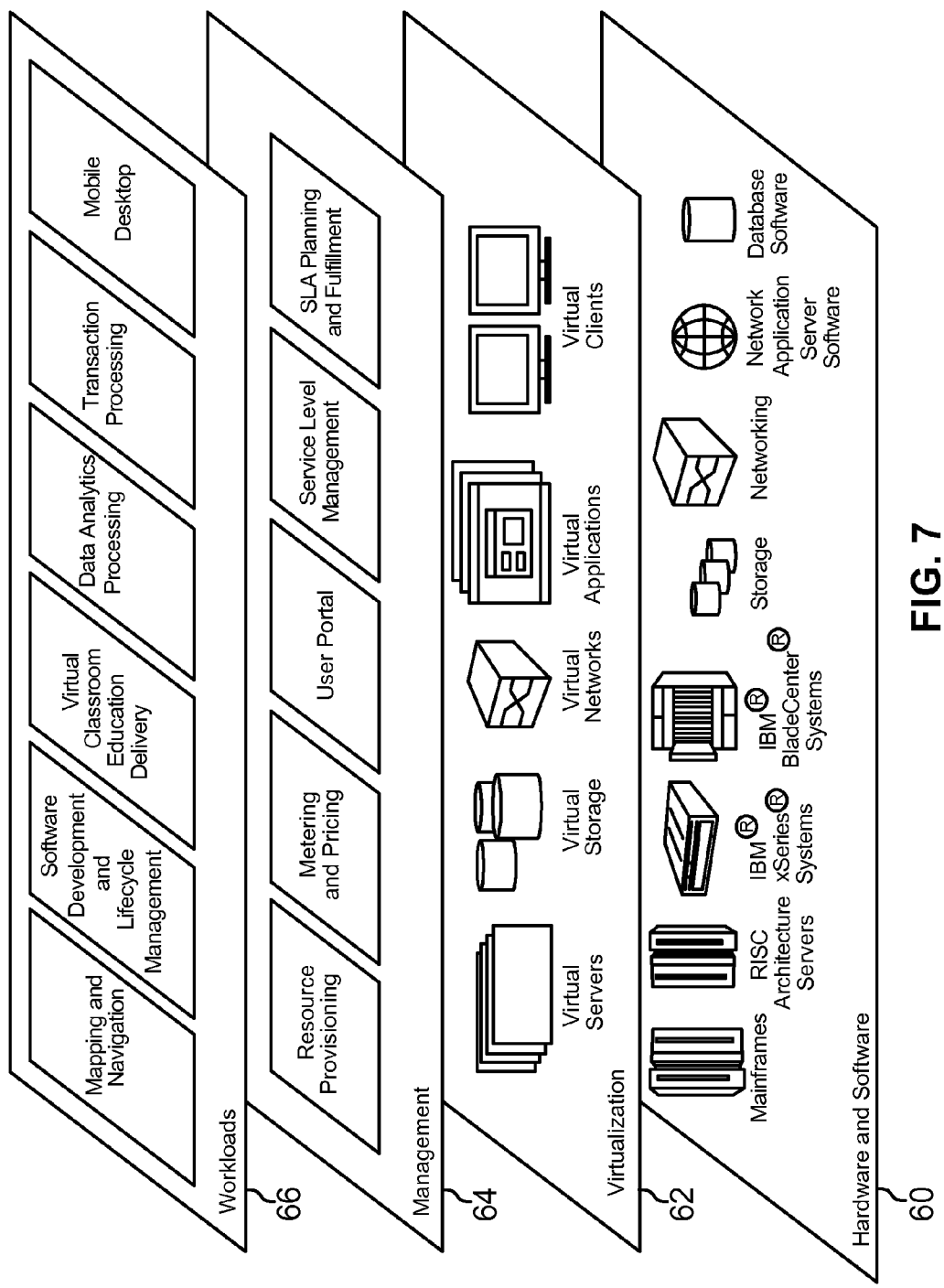

STORAGE DEVICE DATA MIGRATION

BACKGROUND

The present disclosure relates to computer systems storage services, and more specifically, data migration on server systems.

Cloud computing is an established trend in enterprise and consumer computing, making it easier to perform computational tasks in cloud datacenters. The cloud datacenters are accessed by clients through an existing network. Some cloud based solutions keep all data in the cloud. Storage in cloud environments may be distributed on a range of dedicated storage devices such as network-attached storage (NAS) or storage area network (SAN) products or storage may be distributed across different compute nodes via the help of a distributed storage layer, which combines the local disks of all participating nodes into one consistent pool. NAS systems store data in a NAS server in a local files system directory structure and provides access to this data to NAS clients through a network using remote file system protocols.

SUMMARY

According to embodiments of the present disclosure a computer-implemented method for migrating files from a source server to a target server are disclosed. The method includes determining file property information for one or more data files on the source server. One or more data file entries are created in a file property table with the file property information for each data file. A data file entry is selected from the file property table. The file property information of the selected data file entry from the file property table is compared to the file property information of the corresponding data file stored in the source server to determine whether there is a match. In response to determining a mismatch between the file property information of the data file entry to the file property information of the corresponding data file, the data file in the source server is copied to the target server. The data file copied to the target server is verified to be the same as the data file of the source server.

Other embodiments are directed to a computer program product and a computer system configured to perform the method of migrating data files from a source server to a target server.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 illustrates an example file property table of the migration module, according to various embodiments.

FIG. 7 illustrates an abstraction model layer, according to various embodiments.

Figure 1:
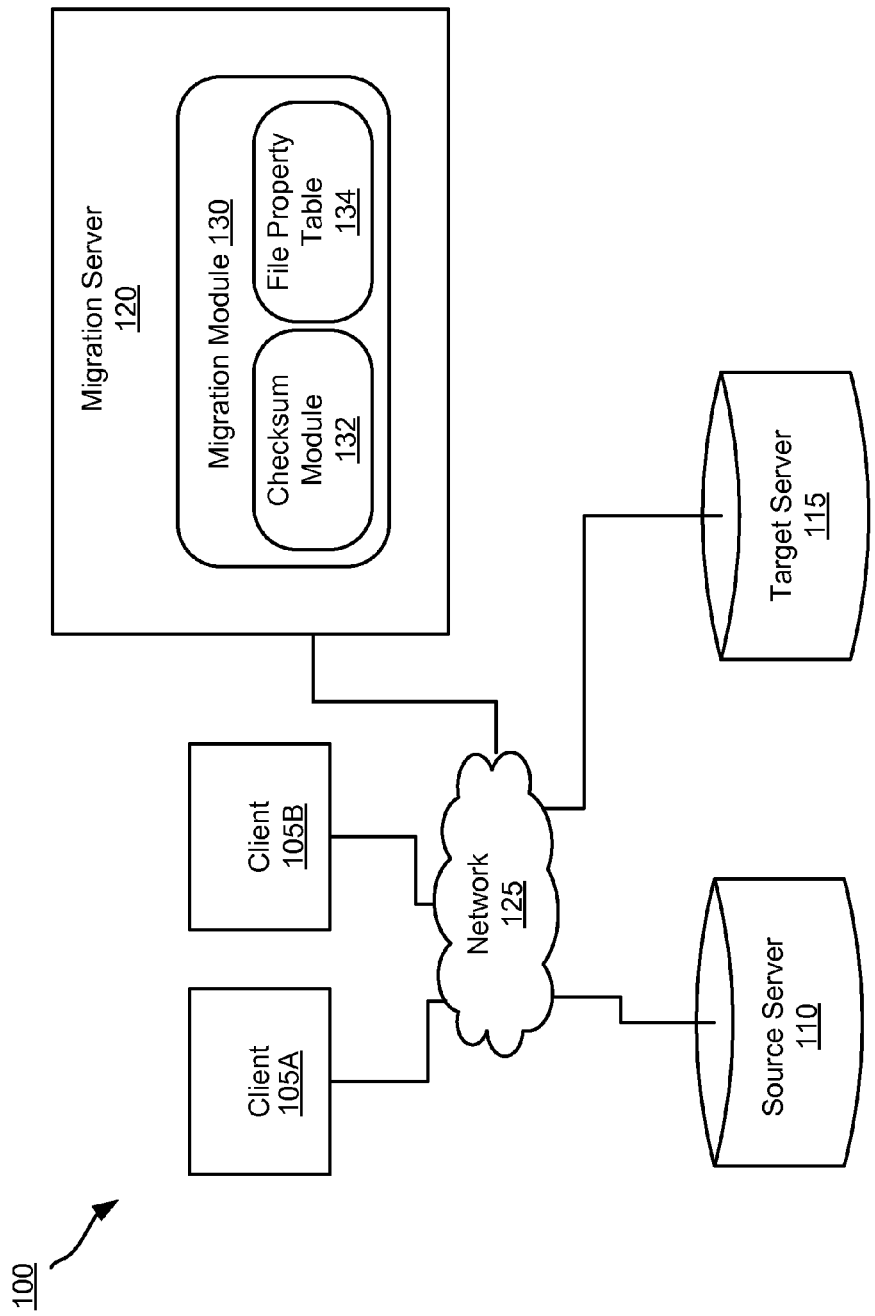
FIG. 1 illustrates a storage system having a migration module for data migration, according to various embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to computer systems storage services, and more specifically, data migration on server systems. When migrating data of a storage service such as a network attached storage (NAS) services from a server storing the data files (source server) to a new server (target server), clients of the source server may still be accessing and modifying the files on the source server since the migration process may take days to complete. The modifications may make the migration process less reliable, less complete, and more resource intensive with respect to network and system resources due to having to update already migrated files.

Various embodiments herein provide for a migration module that performs a migration process that migrates data files from a source server to a target server. The migration module determines file property information and other metadata from the data files on the source server. The migration module stores the file property information for each file in a data file entry in a file property table. The data file entries are sorted by a criteria and the first data file entry from the file property table may be selected by the migration module. The migration module may compare the file property information of the data file entry to the current file property information of the file within the source server to determine whether any updates to the file within the source server have occurred.

When there is a mismatch between the file property information of the file data entry in the file property table and the file property information of the file within the source server, then the file in the source server is copied to the target server. The file copied to the target server is verified to be the same as the file in the source server. This may be done by calculating and comparing checksums or by another verification process. If the file in the target server is verified, then the file property table is updated with the current file property information of the file and stores an indication that the file has been copied to the target server.

A NAS service is a storage service that may store data in the form of files and directories, for example, and may provide access to this data to NAS clients through remote file system protocols. Examples of remote file system protocols may are Common Internet File System (CIFS also known as SMB protocol) and the Network File System protocol (NFS). NAS clients may connect to the NAS server via a network in order to process data including reading, writing, deleting, changing and renaming files and directories. Multiple NAS clients can access the same file at the same time whereby the NAS server ensures that only one client has the permission to write the file or a portion of the file.

When a NAS server has to be replaced, then the files stored in the NAS server, also referred to as the source NAS server, have to be migrated to the new NAS server, also referred to as target NAS server. The migration process may copy each directory and file from the source NAS server to the target NAS server including the metadata associated with the files and directory. The metadata may include common metadata and protocol specific metadata. Examples of common metadata include file and path names, time stamps, file size, owning user and groups, access permission for the file, per access protocol. Protocol specific metadata, such as for SMB protocol, may include access control lists (ACL), alternate data streams (ADS), extended attributes, and share permissions.

In some situations, the migration process may run as an application program on one or more servers coupled to the source and target NAS servers via the network. A requirement for a data migration process may include completeness of all the files and directories including their metadata copied from the source server to the target server. Another requirement may include integrity of the data files in that the data of the files in the target server must exactly match the data of files on the source server. Another requirement may be keeping the duration of the migration process in a predictable time frame According to various embodiments, a data migration process is described that increases file integrity and decreases time of the migration when clients are accessing the source server during the data migration process. By intelligently copying files, decoupling file copying from certain metadata copying, and analyzing files of the source server before copying them to the target server, embodiments may improve on the requirements for data migration process. While the data migration process is occurring, client systems may continue to work with the source server by reading, writing, changing, and deleting files.

FIG. 1 illustrates a storage system 100 for data migration, according to various embodiments. The storage system 100 may include a source server 110 that stores data of files and directories which are being accessed by one or more clients such as clients 105A and 105B. The storage system 100 may be a NAS system and may be discussed in terms of a NAS system herein; however embodiments of the present disclosure should not be limited to just NAS systems as other storage systems and services may be contemplated.

A target server 115 may act as a new server for the data migration process and may initially not host any files. The clients 105A and 105B, source server 110, and target server 115 may be communicatively coupled via a network 125. The migration process may be hosted by a migration server 120. The migration server 120 may also be communicatively coupled to the other components via the network 125. The network 125 may be based on Ethernet (e.g. local area network (LAN) and wide area network (WAN)). In various embodiments the source server 110 and the target server 115 may be NAS servers. In various embodiments, the source server 110 and the target server 115 may be different cloud services and embodiments may be related to migrating data files from one cloud service to another cloud service.

The migration server 120 may include a migration module 130. The migration module 130 may include a checksum module 132 and a file property table 134, according to various embodiments. In embodiments, the migration server 120 with the migration module 130 may be the same server as the source server 110 or the target server 115. In embodiments, the migration server 130 can be hosted in a private and public cloud.

The checksum module 132 may be able to read a file from the source server 110 and calculate a checksum at the same time. The checksum module 132 may read the file into a buffer of the migration server 130 and when the entire file has been read, the checksum module 132 may calculate the checksum using a preconfigured verification checksum method such as cyclic redundancy code (CRC), or a crypto graphical hash function such as Message Digest 5 (MD5) or Secure Hash Algorithm 256 (SHA256). Once the checksum is calculated, the checksum module 132 may write the file to the target server 115. Therefore, calculating a checksum does not require reading the file twice (first to calculate the checksum and second to write the file to the target).

The migration module 130 may be configured to obtain file property information for every file and directory stored in the source server 110 and store this information in file property table 134. The file property information may include metadata of each file such as common metadata and protocol specific metadata as described above. The file property information may be obtained with standard file system commands, which are part of the network file system protocol (e.g., Unix command: IS, stat; Windows commands: dir). This file property information may be stored in the file property table 134 in a data file entry. An example of the structure of the file property table 134 is illustrated in FIG. 2.

The file property table 134 may be used to migrate the data files and directory to the target server 115. After the migration module 130 collects the file property information from a data file from the source server 110. The data file entries in the file property table 134 may be sorted based on a sort criteria that is automated or selected by a user. The sort criteria may be used to sort the data entries in the file property table according to last access time of the file, modification time, creation time, or any combination of these, for example. This may allow for migrating files that have not been accessed or modified lately, for example, to be migrated first because of the low probability that they will be accessed while the data migration is taking place. This may reduce migration time when more frequently used files are migrated last.

After the file property table 134 has been sorted, then a data file entry from the file property table 134 may be selected. The data file entries may be selected sequentially, in various embodiments. The migration module 130 may determine whether the file of the data file entry exists still in the source server 110. If the file still exists, then the migration module 130 may compare the file property information (e.g., time stamps and file size) that is in the file property table 134 for the file to the current file property information in the source server 110. If there is not a match, the checksum module 132 of the migration module 130 may read the file from the source server 110 while calculating a first checksum. The checksum module 132 may then write the file to the target server 115 and read the file from the target server while calculating a second checksum. The first checksum and the second checksum are compared by the checksum module 132. If the first and second checksums do not match, then the file is copied to the target server 115 again. If the checksums do match, then the file property table 134 may be updated with the current file property information of the transferred file. Similarly, the process may be done for metadata of the file, such as the ACL, after the file has been migrated. Separating the metadata migration from the file migration may allow for the file to be migrated and if the metadata changes, only the metadata needs to be migrated again and not the entire file as well.

FIG. 2 illustrates an example file property table 200 of the migration module 130 of FIG. 1, according to various embodiments. The file property table 200 may correspond with file property table 134 of FIG. 1. The migration module 130 may be configured to obtain file property table information which may be metadata for every file and directory stored in the source server 110. File property table 200, its structure, and information stored are for illustration purposes. Other configurations and information may be considered. Column 202 of the file property table 200 may store the file and directory names. Each row of column 202 may state the unique path and file name for each file in the source server 110. The file size of each file may be stored in column 204. The file size may be the current file size of the file. In column 206 the data checksum for each file may be located. The data checksum may be used to verify the integrity of the file on the target server and the source server. Column 208 (ctime) may store the time stamp of the creation of the file. Column 210 (atime) may store the time stamp of the last access time to the file. Column 212 (mtime) may store the time stamp when the file was last modified.

In some protocols, additional metadata may be supported. For example in column 214 an ACL and metadata checksum may be stored. The ACL and metadata checksum is the checksum for the metadata, while the data checksum is the checksum for the data file. In some protocols data streams may allow to store descriptive metadata along with the file data. The checksum of column 214 may be used to compare source and target versions for the ACL or other metadata. Column 216 may store an indicator as to whether the file has been copied to the target server 115. Column 218 may store an indicator as to whether the file ACLs or other descriptive metadata have been copied to the target server 115.

Row 220 is a first data file entry that illustrates the file properties of a file named /fs/officeDoc1 (column 202) which is one megabyte (column 204) and the data checksum is ABC1234 (column 206). The creation time, last access time and modification time of the file are shown in columns 208, 210, and 212, respectively. The ADS/xattr checksum is "0987DEF' and the ACL/metadata checksum may be VED0123' (column 214). The file had been copied to the target server such as target server 115 of FIG. 1 according to the 'Y' in column 216 and the ACLs are also copied according to 'Y" in column 218.

Row 222 is a second data file entry that illustrates the file properties of a filed named /fs/officeDoc2 (column 202) which is ten megabytes (column 204) and the data checksum is 012ABC4 (column 206). The creation time, last access time and modification time of the file are showing in columns 208, 210, and 212, respectively. The ADS/xattr checksum is "AB123CD' and the ACL/metadata checksum may be 'FE09876' (column 214). The file has not been copied to the target server 115 according to the 'N' in column 216 and the ACLs have also not been copied according to 'N' in column 218.

All checksums illustrated in file property table 200 are shown as an example. Checksums may be calculated by hash function, such as MD5. Depending on the hash function, the hash function creates a hash digest which uniquely identifies the data where the hash function had been applied for. The hash digest may be referred to as the checksum. The checksum, according to embodiments, may also be calculated by other means besides hash function such as cyclic redundancy code (CRC).

Figure 3A:
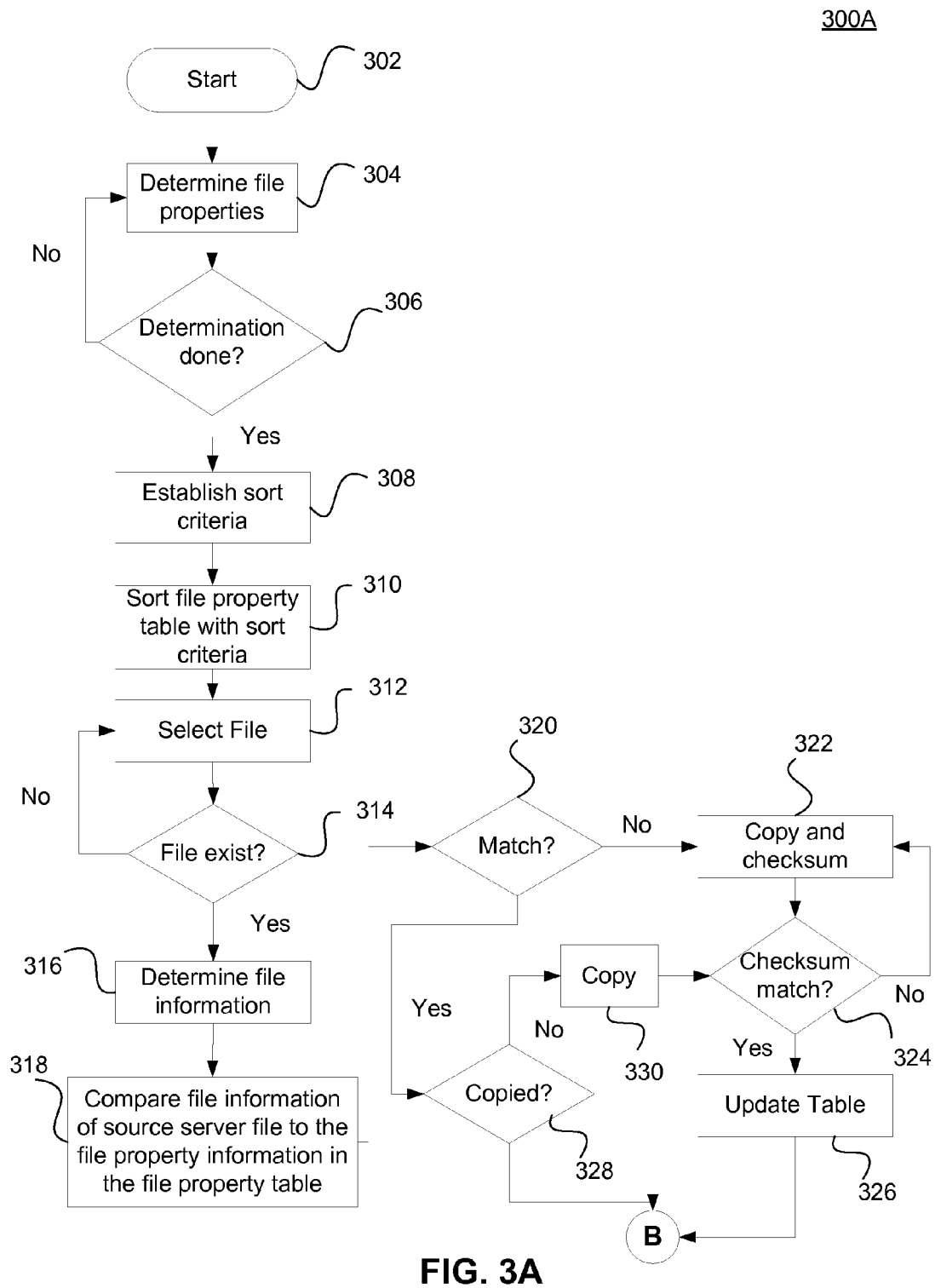
FIG. 3A illustrates a method of data migration by the migration module, according to various embodiments.
Figure 3B:
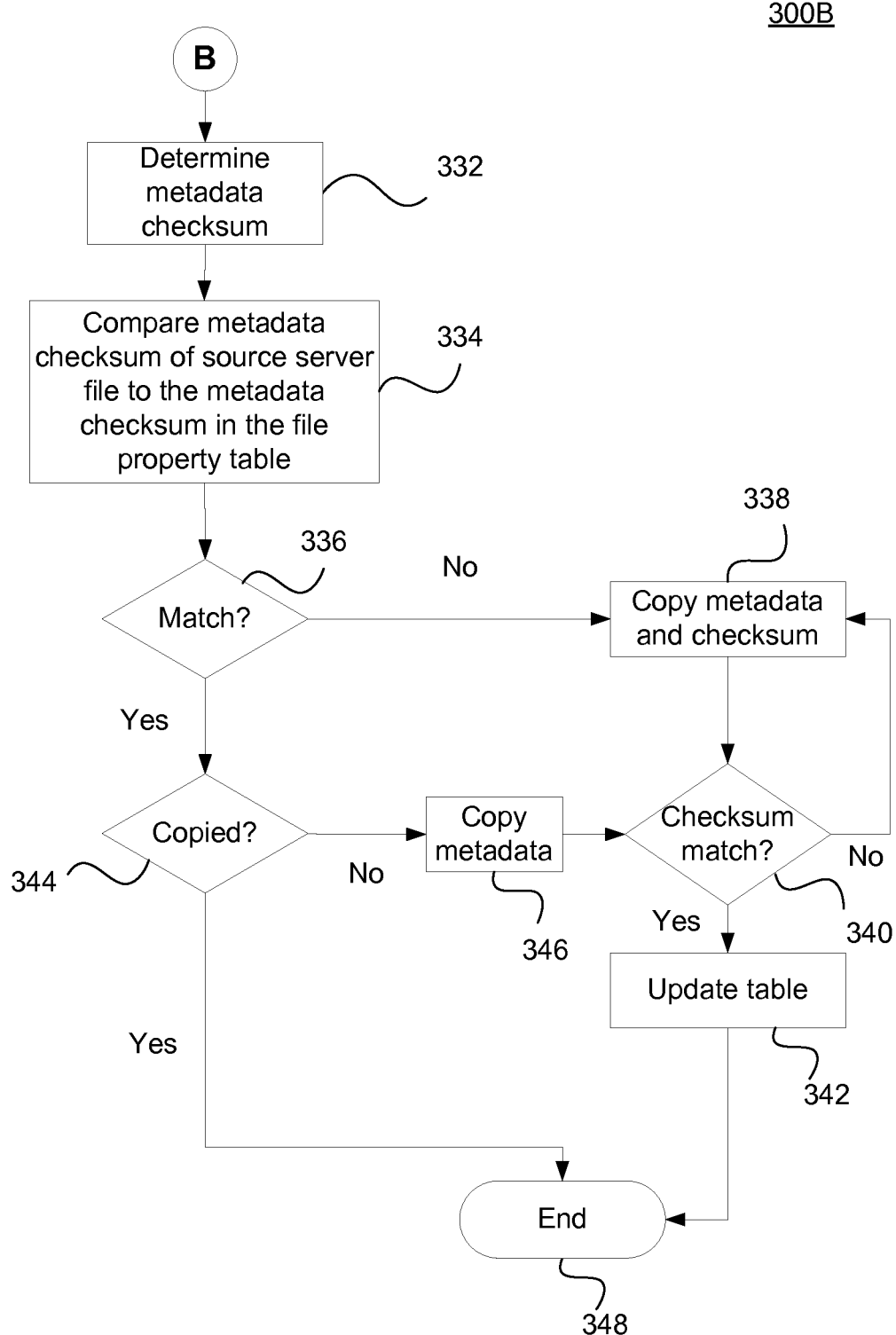
FIG. 3B illustrates a method of migrating the file access control lists (ACLs) to the target server, according to various embodiments.

FIG. 3A illustrates a method 300A of data migration by the file migration module 130 of FIG. 1, according to various embodiments. Method 300A in FIG. 3A may illustrate a method of copying the data files from a source server to a target server, such as source server 110 and target server 115 of FIG. 1, after populating a file property table, such as file property table 134 of FIG. 1. Method 300B of FIG. 3B illustrates the method copying the file ACLs to the target server from the source server that may follow the method 300A.

The method 300A begins at operation 302. In operation 304, the file property information for every file and directory in the source server, such as source server 110 of FIG. 1, may be determined by the migration module 130 and stored in the file property table 134 of FIG. 1. This may include some or all of the columns in the file property table 134. In other embodiments other file property information may be included in the file property table. The file property information may be obtained with standard file system commands which may be part of the network file system protocol, (e.g. Unix command: ls, stat; Windows® commands: dir).

In operation 306, the migration module 130 may determine whether all of the file property information of the files and directories of the source server 110 has been determined. If the file property information has not been determined, the method 300A may return to operation 304. If all of the file property information has been determined, then the method continues to operation 308.

In operation 308, sort criteria may be established to sort the file property information in the file property table in a particular way. The sort criteria may be based on one or a combination of the file property information values, such as the last access time, modification time, creation time, file and path names, and file size. The sort criteria may be user defined or automatically determined by migration module 130. In various embodiments, where the sort criteria is automatically determined by the migration module 130, the automatic establishment of the sort criteria takes into account the relative amount of files and storage capacity which can be copied to the target server. If the amount crosses a certain threshold the migration module 130 may continue to operation 310 of method 300A. Otherwise, another sort criteria is selected by the migration module 130 and checks the amount of files and storage capacity again until the migration module has determined the number of files and storage capacity to be copied that meets or exceeds the threshold. In operation 310, the migration module 130 sorts the file property table 134 according to the sort criteria.

In operation 312, files may be selected from the file property table 134 by the migration module 130. In various embodiments, the files may be selected in the order they were sorted in operation 310. In operation 314, the migration module 130 may determine whether the selected file exists on the source server 110. The file may have been deleted between the time when the file property table 134 was created and the when the file is to be selected to transfer, for example. If the file does not exist, the method 300A may return to operation 312 to select the next file of the sorted file property table 134. If the file does exist, then the method 300A may continue to operation 316.

In operation 316, the migration module 130 may determine the file property information of the selected file in the source server 110. The information that the migration module 130 may determine is the time stamps (creation, modification, access) and the size of the file in the source server 110. In operation 318, the migration module 130 may compare the file property information of the file in the source server 110 to the file property information of the same file in the file property table 134. In operation 320, if the file property information of the file as indicated in the file property table 132 and the source server 110 is a match, the method 300A continues to operation 328. However, if the file property information does not match, then the method 300A may continue with operation 322.

In operation 322, the checksum module 132 may read the selected file from the source server 110 while calculating a first checksum, write the file to the target server 115 (into the same path), and reads the file from the target server 115 while calculating a second checksum. In operation 324, the migration module 130 may determine whether the first checksum and the second checksum match. If the first and second checksums do not match, then the method 300A may return to operation 322. If the first and second checksums do match, then method 300A continues with operation 326. In operation 326, the migration module 130 may update the file property table 134 with the file property information of the file that had been copied to the target server 115. For example, the migration module 130 may update the file property table 200 of FIG. 2 for the migrated file with the correct file size (column 204), file checksum (column 206), the time stamps (columns 208, 210, and 212), and that the file has been copied (column 216). In various embodiments, other file property information may be updated. The method 300A may continue to operation 330 of method 300B of FIG. 3B.

Returning to operation 320, when the migration module compares the file property information from the source server file to the file property information in the file property table 134 and determines a match, then the method 300A may continue with operation 328. In operation 328, the migration module 130 may determine whether the selected file has been copied by examining the file property table 134 (column 216). If the file has been copied, then the method 300A may continue to the operation 330 of method 300B of FIG. 3B denoted by checkpoint B. If, in operation 328, the file has not been copied to the target server 115, then the method 300A may continue to operation 330. In operation 330, the file may be copied by the checksum module 132 from the source server 110 to the target server 115. The file may then be read from the target server 115 while the second checksum is being calculated by the checksum module 132. The first checksum is set to the checksum stored in the file property table 206 (column 206 of FIG. 2). The second checksum and first checksum are compared in operation 324 as described above.

Referring now to FIG. 3B, FIG. 3B illustrates method 300B of copying metadata of data files such as the file access control lists (ACLs) to the target server 115, according to various embodiments. The method 300B may be a continuation of method 300A. The metadata may be transferred separately from the file data because in some instances the metadata may be updated while the file data has not been updated. Therefore, by saving the metadata separately, the file data does not have to be saved again if it is unchanged. After the file has been copied to the target server 115 from the source server 110 by the migration module 130, the method 300B may begin at checkpoint B. In operation 332, the migration module 130 may determine a first checksum of the metadata of the selected file of FIG. 3A that is in the source server 110. In various embodiments the metadata may be ACLs that may change without the data file changing or other metadata that may change independently of the data file to which it belongs. In operation 334, the migration module 130 may compare the first checksum of the metadata in the source server 110 to the metadata checksum stored in the file property table 134 (column 214) for the selected file. In operation 336, the migration module 130 may determine whether or not the metadata checksums match. If the metadata checksums do match the method 300B may continue to operation 344. If the metadata checksums do not match, then the method 300B may continue to operation 338.

In operation 338, the checksum module 132 may read the metadata from the source server 110 for the selected file and copy it to the target server 115. The metadata is then read from the target server 110 and a second checksum is calculated. In operation 340, the first metadata checksum of the selected file in the source server 110 may be compared to the second metadata checksum determined in the target server 115 to determine whether they match. If the first metadata checksum does not match the second metadata checksum, then the method may return to operation 338 where the metadata copy process is repeated. If the first metadata checksum matches the second metadata checksum, then method 300B may continue to operation 340. In operation 340, the file property table 134 may be updated with the new metadata checksum (column 214 of FIG. 2) and the metadata copied field (column 218 of FIG. 2) is set to Y to indicate that the metadata has been copied to the target server. The method 300B may then end at operation 348.

Returning to operation 336, if the first metadata checksum matches the metadata checksum stored in the file property table 134, then the method 300B may continue with operation 344. In operation 344, the migration module 130 may determine whether the metadata of the selected file has been copied to the target server 115 by examining the file property table 134 (column 218 of FIG. 2). If the metadata has been copied to the target server 115, then the method 300B may end at operation 348. If the metadata has not been copied to the target server 115, then the method 300B may continue to operation 346. In operation 346, the metadata may be copied from the source server 110 to the target server 115 and applied to the file it is associated with. The metadata from the target server 115 is then read by the checksum module 132 and a second metadata checksum is calculated. The checksum of the file property table 134 (column 214) is set to the first checksum of the source server 110. The method 300B continues to compare the first and second checksums in operation 340 as explained before. In various embodiments, the method 300B may end at operation 348. In various embodiments, the migration process may restart in step 302 of FIG. 3A for remaining files. The subsequent establishment of the sort criteria in operation 308 may establish the same sort criteria or a different one.

There are several advantages of the various embodiments of the present disclosure. The collection of information about all files and directories stored in the source server 110 that is used with the file property table 134 may allow a subsequent analysis of the files and directories to be migrated. The analysis may help to determine the best migration strategy (best use of time and resources). For example, if the modification time of most files or most of the allocated capacity is below a certain threshold, then the file property table 134 may be sorted based on the modification time and the oldest and youngest files may be selected first for migration. This may be optimal because these files might not be changed again, so they do not have to be migrated again in subsequent migration phases.

Another advantage is that embodiments may be capable of differentiating changes of the file content from changes to the metadata of a file. This may mean that a file which had been copied already form the source server 110 to the target server 115 using method 300A of FIG. 3A does not have to be copied again if only metadata of the files change. Only metadata will have to be copied by method 300B. This may reduce the amount of time required for migration and it also may reduce the amount of data being transferred.

Another advantage of various embodiments may be that the calculation of a checksum of a file while the file is being read (e.g. form the source server 110) may reduce the amount of data being transferred and decrease migration server resource use because the file only has to be read once. In addition it reduces the workload on the source server 110.

Figure 4:
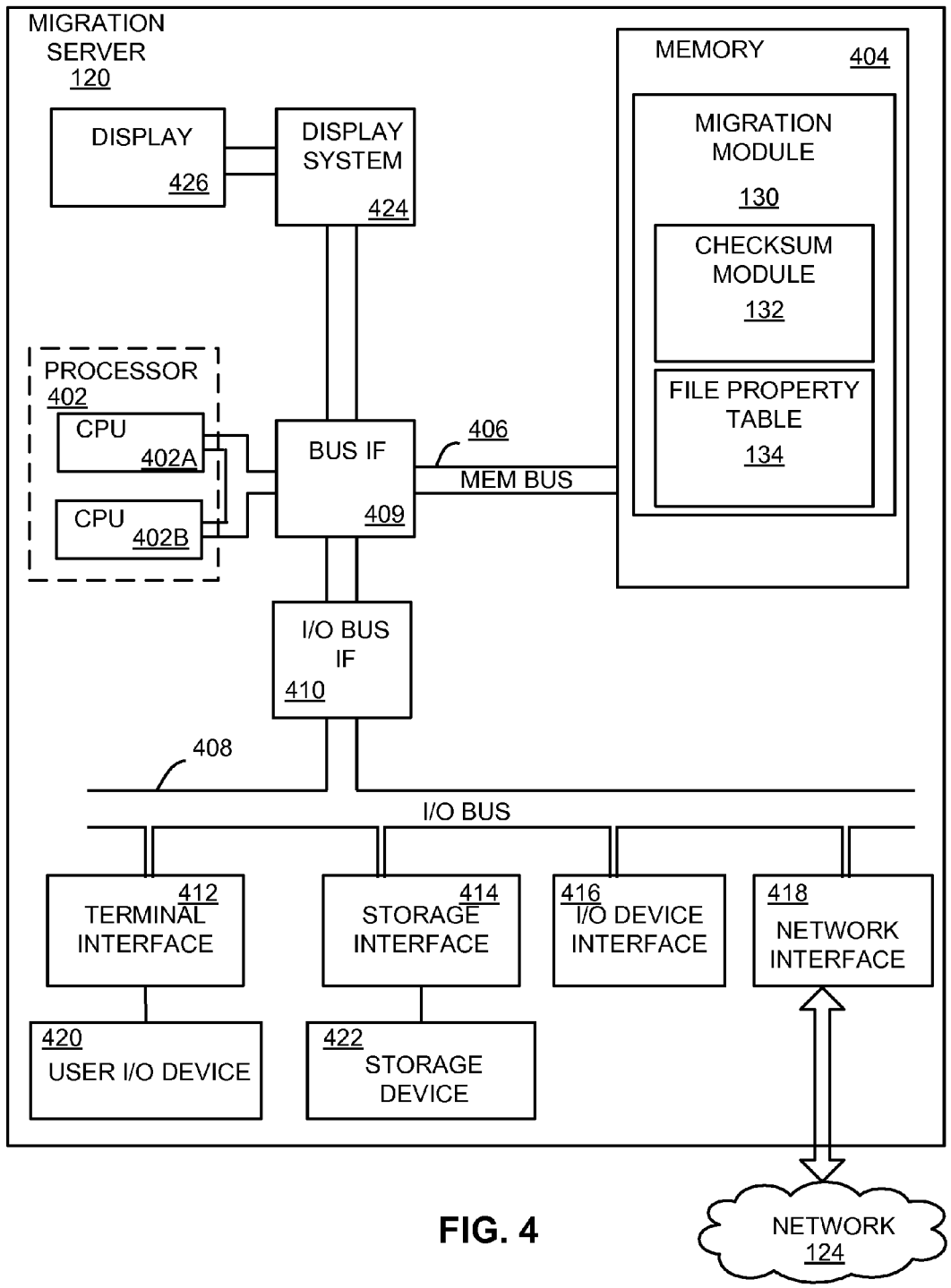
FIG. 4 is a schematic block diagram illustrating various embodiments of the migration server of FIG. 1.

FIG. 4 is a schematic block diagram illustrating various embodiments of the migration server 120 of FIG. 1. The migration server 120 is one example context in which embodiments may be implemented. The mechanisms and apparatus of the various embodiments disclosed herein apply equally to any appropriate computing system such as source server 110, target server 115, and the clients 105A and 105B. The major components of the migration server 120 include one or more processors 402, a memory 404, a terminal interface 412, a storage interface 414, an Input/Output ("I/O") device interface 416, and a network interface 418, all of which are communicatively coupled, directly or indirectly, for inter-component communication via a memory bus 406, an I/O bus 408, bus interface unit ("IF") 409, and an I/O bus interface unit 410.

The migration server 120 may contain one or more general-purpose programmable central processing units (CPUs) 402A and 402B, herein generically referred to as the processor 402. In an embodiment, the migration server 120 may contain multiple processors; however, in another embodiment, the migration server 120 may alternatively be a single CPU system. Each processor 402 executes instructions stored in the memory 404 and may include one or more levels of on-board cache.

In an embodiment, the memory 404 may include a random-access semiconductor memory, storage device, or storage medium (either volatile or non-volatile) for storing or encoding data and programs. In various embodiments, the memory 404 represents the entire virtual memory of the migration server 120, and may also include the virtual memory of other computer systems coupled to the migration server 120 or connected via a network 125. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the following: a migration module 130, a checksum module 132, and a file property table 134. These programs and data structures are illustrated as being included within the memory 404 in the migration server 120, however, in other embodiments, some or all of them may be on different computer systems and may be accessed remotely, e.g., via a network 125. The migration server 120 may use virtual addressing mechanisms that allow the programs of the migration server 120 to behave as if they only have access to a large, single storage entity instead of access to multiple, smaller storage entities. Thus, while the migration module 130, the checksum module 132, and the file property table 134 are illustrated as being included within the memory 404, they may not necessarily all be completely contained in the same storage device at the same time.

In an embodiment, the migration module 130, the checksum module 132, and the file property table 134 may include instructions or statements that execute on the processor 402 or instructions or statements that are interpreted by instructions or statements that execute on the processor 402 to carry out the functions as further described below. In another embodiment, the migration module 130, the checksum module 132, and the file property table 134 may be implemented in hardware via semiconductor devices, chips, logical gates, circuits, circuit cards, and/or other physical hardware devices in lieu of, or in addition to, a processor-based system. In an embodiment, the migration module 130, the checksum module 132, and the file property table 134 may include data in addition to instructions or statements. In various embodiments, the source server 110 and the target server 115 may contain the migration module 130, the checksum module 132, and the file property table 134.

The migration server 120 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In an embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be onboard an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the migration server 120, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the migration server 120 to other digital devices and computer systems; these communication paths may include, e.g., one or more networks 115.

Although the migration server 120 shown in FIG. 4 illustrates a particular bus structure providing a direct communication path among the processors 402, the memory 404, the bus interface 409, the display system 424, and the I/O bus interface unit 410, in alternative embodiments the migration server 120 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the migration server 120 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the migration server 120 is a multi-user mainframe computer system, a single-user system, or a server computer or similar device that has little or no direct user interface, but receives requests from other computer systems (clients). In other embodiments, the migration server 120 may be implemented as a desktop computer, portable computer, laptop or notebook computer, tablet computer, pocket computer, telephone, smart phone, or any other suitable type of electronic device.

FIG. 4 is intended to depict the representative major components of the migration server 120, according to various embodiments. Individual components, however, may have greater complexity than represented in FIG. 4. Components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

Embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
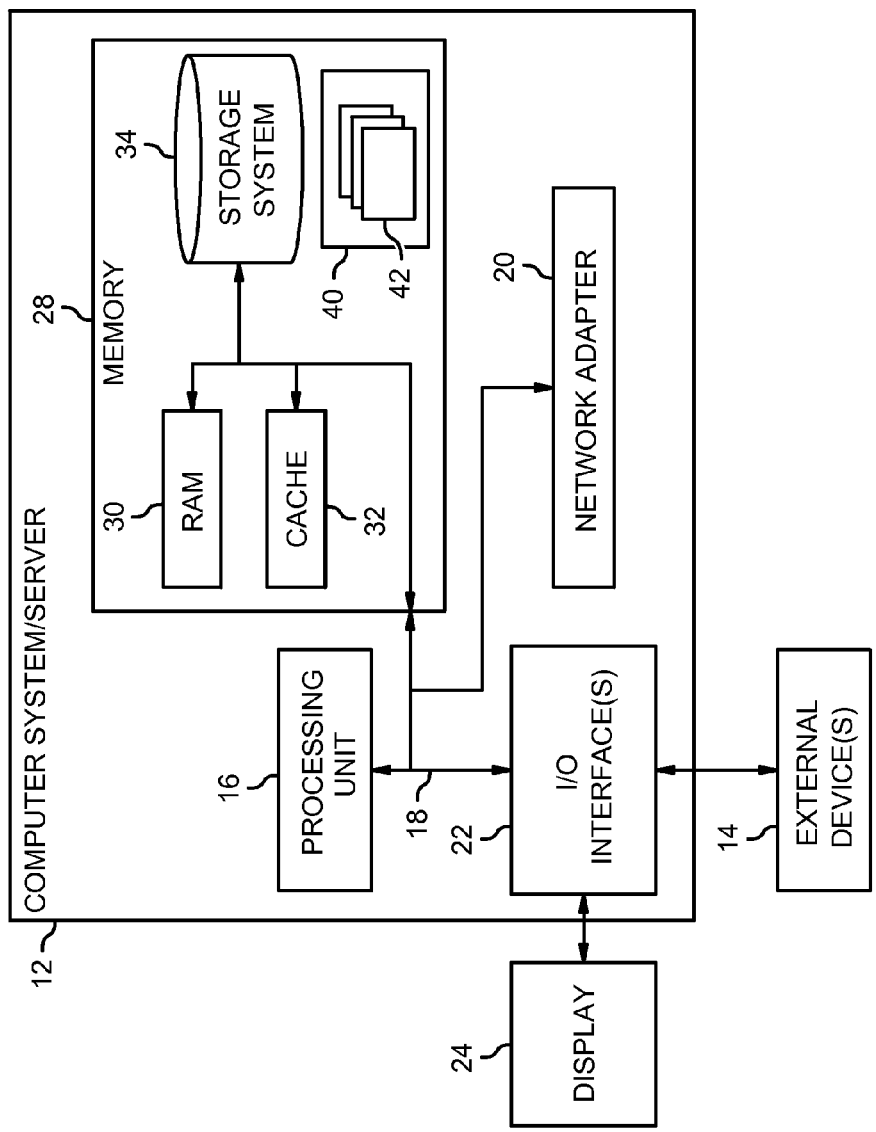
FIG. 5 illustrates a cloud computing node according to various embodiments.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As was further depicted and described above, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
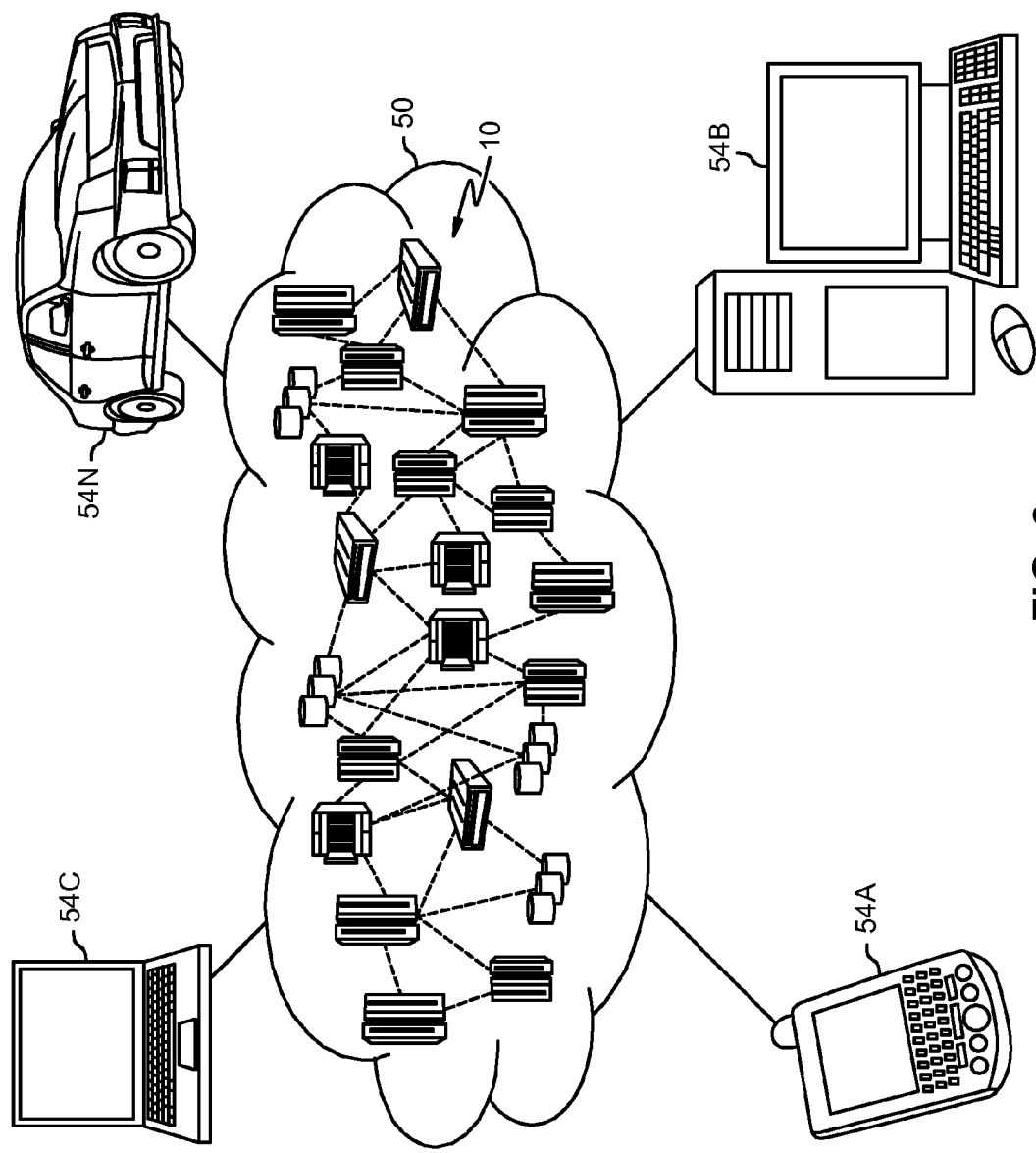
FIG. 6 illustrates a cloud computing environment, according to various embodiments.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). Another example of software components include the migration module for migrating files from a source server to a target server as described with respect to embodiments herein.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Another example includes adaptive replica migration in distributed computer storage platforms.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for migrating files from a source server to a target server, comprising:
   determining file property information for one or more data files on the source server;
   creating one or more data file entries in a file property table with the file property information for each data file;
   selecting a data file entry from the file property table;
   comparing the file property information of the selected data file entry from the file property table to the file property information of the corresponding data file stored in the source server to determine whether there is a match;
   in response to determining a mismatch between the file property information of the data file entry to the file property information of the corresponding data file, copying the data file in the source server to the target server;
   verifying the data file copied to the target server is the same as the data file of the source server;
   determining a first metadata checksum from metadata of the selected data file in the source server;
   comparing the first metadata checksum to a file property table metadata checksum of the selected data file in the file property table to determine whether there is a match;
   in response to determining a mismatch between the first metadata checksum and the file property table metadata checksum for the selected data file, copying the source server metadata of the selected data file to the target server; and
   verifying the metadata copied to the target server is the same as the metadata of the source server.

2. The method of claim 1, further comprising:
   updating the file property table with file property information of the copied data file when the data file copied to the target server is the same as the data file of the source server, such that the file property information in the file property table is the current file property information of the copied data file, and
   stores an indication that the file has been copied to the target server.

3. The method of claim 1, wherein the metadata and the metadata checksum is an access control list (ACL) and an ACL checksum respectively.

4. The method of claim 1, further comprising:
sorting the data file entries of the file property table based one or more sorting criteria, wherein the sorting criteria is based on at least one of the file property information.

5. The method of claim 4, wherein the file property information for each data file entry includes at least one of a file size, a modification time, a creation time, an access time, a path and file name extension, a data file checksum, the metadata checksum, a data file copy indicator, and an metadata copy indicator.

6. The method of claim 1, wherein the copying of the data file from the source server to the target server and verifying the data file copied to the target server is the same as the data file of the source server include:
reading the data file from source server;
calculating a first data file checksum of the data file from the source server;
writing the data file to the target server;
reading the data file from the target server;
calculating a second data file checksum of the data file from the target server;
comparing the second data file checksum to first data file checksum to determine whether the first data file checksum and the second data file checksum match; and
updating the file property table with the file property information of the data file in the target server when the first and second checksums match.

7. The method of claim 6, further comprising:
when the first data file checksum and the second data file checksum are a mismatch, copying of the data file from the source server to the target server; and
verifying the data file copied to the target server is the same as the data file of the source server.

8. The method of claim 6, wherein the checksums are at least one of a cyclic redundancy code (CRC), a message digest five (MD5) hash function, and a secure hash algorithm 256 (SHA256) hash function.

9. The method of claim 1, wherein the source server and the target server are network attached storage (NAS) servers.

10. The method of claim 1, wherein the copying of the metadata from the source server to the target server and verifying the metadata copied to the target server is the same as the metadata of the source server include:
reading the metadata from source server;
writing the metadata to the target server;
reading the metadata from the target server;
calculating a second metadata checksum of the metadata from the target server;
comparing the second metadata checksum to the first metadata checksum to determine whether the first, metadata checksum and the second metadata checksum match; and
updating the file property table with the second metadata checksum of the metadata in the target server and indicting the metadata has been copied when the first metadata checksum and second metadata checksums match.

11. A computer system for migrating files from a source server to a target server, comprising:
a processor; and
a memory communicatively coupled to the processor, wherein the memory is encoded with instructions and wherein the instructions when executed by the processor include:
determining file property information for one or more data files on the source server;
creating one or more data file entries in a file property table with the file property information for each data file;
selecting a data file entry from the file property table;
comparing the file property information of the selected data file entry from the file property table to the file property information of the corresponding data file stored in the source server to determine whether there is a match;
in response to determining a mismatch between the file property information of the data file entry to the file property information of the corresponding data file, copying the data file in the source server to the target server;
verifying the data file copied to the target server is the same as the data file of the source server;
determining a first metadata checksum from metadata of the selected data file in the source server;
comparing the first metadata checksum to a file property table metadata checksum of the selected data file in the file property table to determine whether there is a match,
in response to determining a mismatch between the first metadata checksum and the file property table metadata checksum for the selected data file, copying the source server metadata of the selected data file to the target server; and
verifying the metadata copied to the target server is the same as the metadata of the source server.

12. The computer system of claim 11, wherein the instructions when executed include, updating the file property table with file property information of the copied data file when the data file copied to the target server is the same as the data file of the source server, such that the file property information in the file property table is the current file property information of the copied data file, and
stores an indication that the file has been copied to the target server.

13. The computer system of claim 12, wherein the copying of the data file from the source server to the target server and verifying the data file copied to the target server is the same as the data file of the source server include:
reading the data file from source server;
calculating a first data file checksum of the data file from the source server;
writing the data file to the target server;
reading the data file from the target server;
calculating a second data file checksum of the data file from the target server;
comparing the second data file checksum to first data file checksum to determine whether the first data file checksum and the second data file checksum match; and
updating the file property table with the file property information of the data file in the target server when the first and second checksums match.

14. A computer program product for migrating files from a source server to a target server, the computer program product comprising a computer readable storage medium having program code embodied therewith, the program code executable by a computer system to perform a method comprising:
determining file property information for one or more data files on the source server;
creating one or more data file entries in a file property table with the file property information for each data file;
selecting a data file entry from the file property table;

comparing the file property information of the selected data file entry from the file property table to the file property information of the corresponding data file stored in the source server to determine whether there is a match;

in response to determining a mismatch between the file property information of the data file entry to the file property information of the corresponding data file, copying the data file in the source server to the target server; and verifying the data file copied to the target server is the same as the data file of the source server;

determining a first metadata checksum from metadata of the selected data file in the source server;

comparing the first metadata checksum to a file property table metadata checksum of the selected data file in the file property table to determine whether there is a match;

in response to determining a mismatch between the first metadata checksum and the file property table metadata checksum for the selected data file, copying the source server metadata of the selected data file to the target server; and verifying the metadata copied to the target server is the same as the metadata of the source server.

15. The computer program product of claim 14, wherein the program code executable by a computer system further includes, updating the file property table with file property information of the copied data file when the data file copied to the target server is the same as the data file of the source server, such that the file property information in the file property table is the current file property information of the copied data file, and stores an indication that the file has been copied to the target server.

16. The computer program product of claim 14, wherein the copying of the data file from the source server to the target server and verifying the data file copied to the target server is the same as the data file of the source server include:

reading the data file from source server;

calculating a first data file checksum of the data file from the source server;

writing the data file to the target server;

reading the data file from the target server;

calculating a second data file checksum of the data file from the target server;

comparing the second data file checksum to first data file checksum to determine whether the first data file checksum and the second data file checksum match; and updating the file property table with the file property information of the data file in the target server when the first and second checksums match.

17. The computer program product of claim 14, wherein the copying of the metadata from the source server to the target server and verifying the metadata copied to the target server is the same as the metadata of the source server include:

reading the metadata from source server;

writing the metadata to the target sewer;

reading the metadata from the target server;

calculating a second metadata checksum of the metadata from the target server;

comparing the second metadata checksum to the first metadata checksum to determine whether the first metadata checksum and the second metadata checksum match; and updating the file property table with the second metadata checksum of the metadata in the target server and indicting the metadata has been copied when the first metadata checksum and second metadata checksums match.

* * * * *